E. BRAZIL.
MOTOR CYCLE ATTACHMENT.
APPLICATION FILED OCT. 19, 1910.
994,715.
Patented June 13, 1911.
2 SHEETS—SHEET 1.
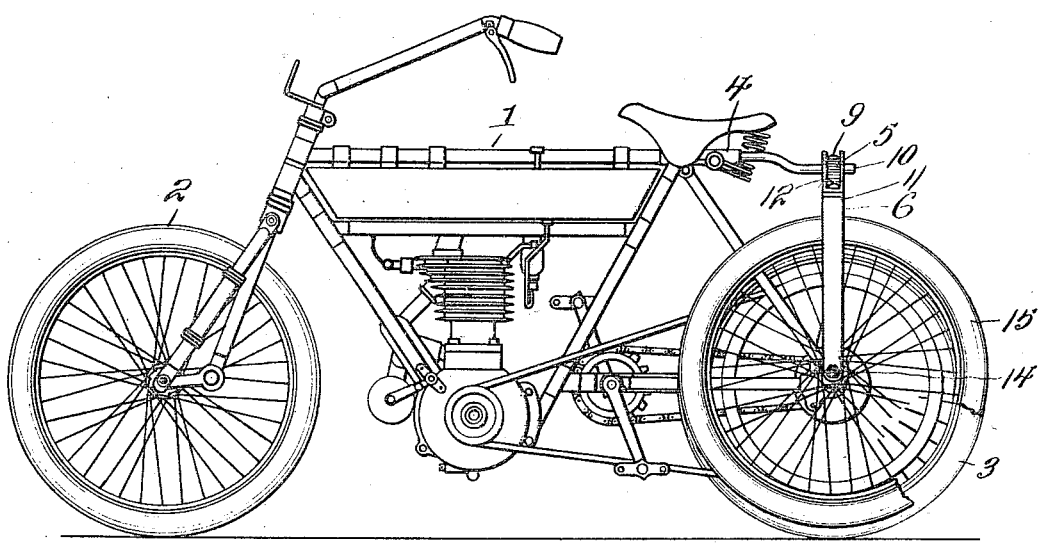
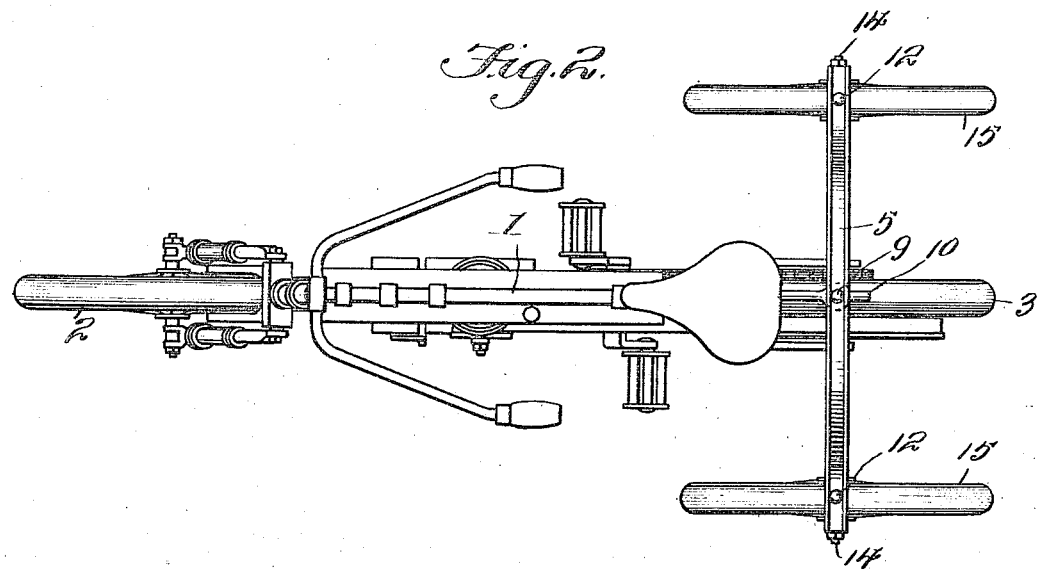
Witnesses
J. T. L. Wright
C. C. Hines
Inventor
Emile Brazil,
By Victor J. Evans,
Attorney

E. BRAZIL.
MOTOR CYCLE ATTACHMENT.
APPLICATION FILED OCT. 19, 1910.

994,715.

Patented June 13, 1911.

2 SHEETS—SHEET 2.

Witnesses
J. T. L. Wright
C. C. Hines

Inventor
Emile Brazil
By Victor J. Evans,
Attorney

UNITED STATES PATENT OFFICE.

EMILE BRAZIL, OF HARTFORD, CONNECTICUT.

MOTOR-CYCLE ATTACHMENT.

994,715.  Specification of Letters Patent.  Patented June 13, 1911.

Application filed October 19, 1910. Serial No. 587,930.

*To all whom it may concern:*

Be it known that I, EMILE BRAZIL, a citizen of the United States, residing at Hartford, in the county of Hartford and State of Connecticut, have invented new and useful Improvements in Motor-Cycle Attachments, of which the following is a specification.

This invention relates to a wheeled truck attachment for motorcycles, the main object of the invention being to provide a device of this character which will prevent tilting of the machine to either side beyond a predetermined extent when the machine is running slowly or standing still.

A further object of the invention is to provide a wheeled attachment embodying wheels arranged on opposite sides of the driving wheel of the machine and normally disposed above the surface of the ground to contact therewith only when the machine tilts laterally to a certain extent, the wheels of the attachment being adapted to give additional support to the machine in making a turn, whereby sharp turns may be made at high speed and without liability of danger.

A still further object of the invention is to provide a wheeled attachment which may be readily and conveniently applied to the machine and removed for repairs or to mend punctured tires.

The invention consists of the features of construction, combination and arrangement of parts, hereinafter fully described and claimed, reference being had to the accompanying drawings, in which:—

Figure 3:
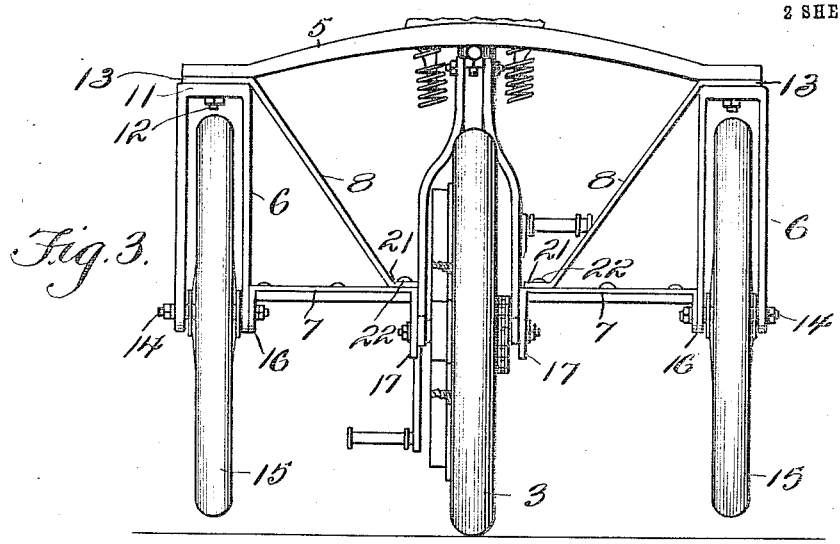
Figure 4:
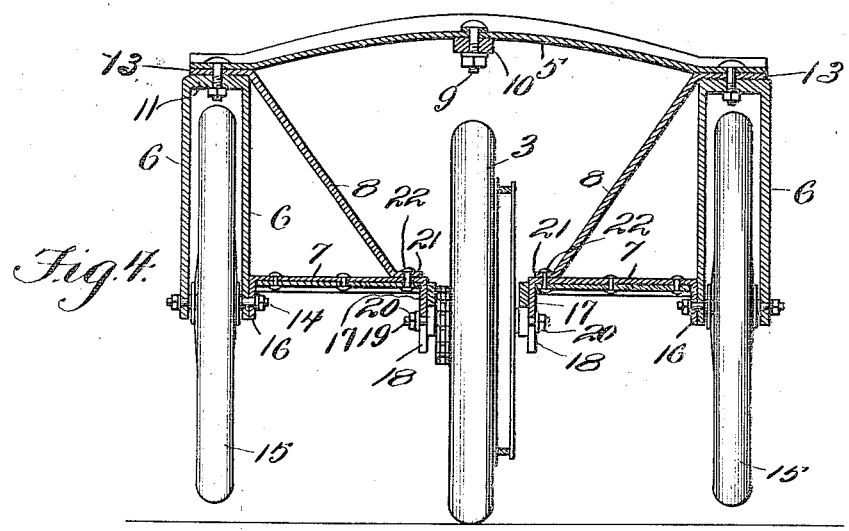
Figure 5:
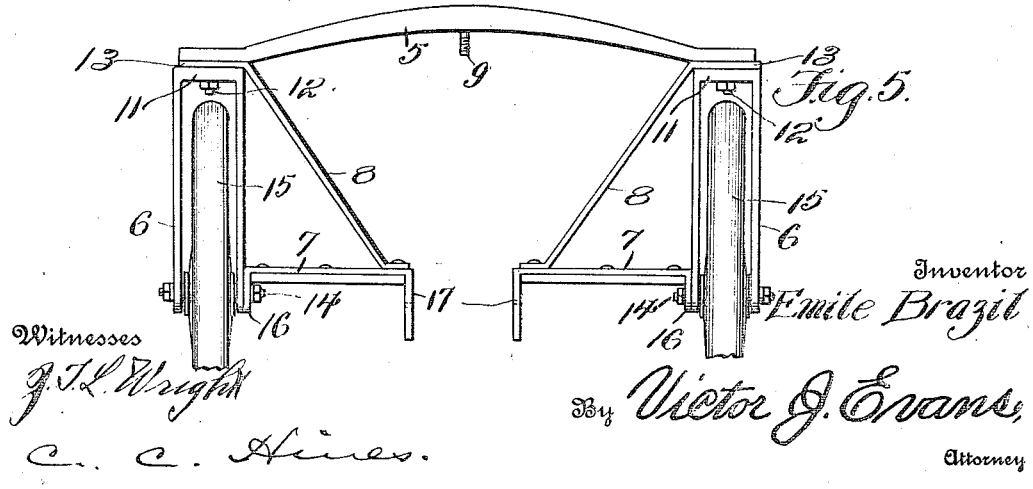

Figure 1 is a side elevation of the frame of a motorcycle equipped with my invention, showing only such parts of the machine as are necessary to a disclosure of the invention. Fig. 2 is a top plan view of the same. Fig. 3 is a rear elevation. Fig. 4 is a vertical transverse section through the frame and driving wheel of the motorcycle and the attachment. Fig. 5 is a view of the attachment removed from the motorcycle.

Referring to the drawings, 1 designates the frame, 2 the front wheel, 3 the rear or driving wheel and 4 the seat post of a motorcycle of any ordinary construction. The attachment comprises a frame formed of an upper longitudinally curved or arched top bracket or frame bar 5, a pair of depending forks 6, a pair of horizontal bracket arms 7 and a pair of braces 8.

The bar 5 extends transversely over the driving wheel 3 in vertical alinement with the axle of said wheel and is perforated centrally for the passage of a bolt 9 coupling the same to a bracket arm 10 bolted or otherwise secured to the said post 4. The ends of the bar 5 are flattened and attached to the crown portions 11 of the forks 6 by bolts 12. Bolts also pass through the angularly bent upper ends 13 of the braces 8 and fasten the same in a firm and durable manner to the bar and forks. The lower ends of the forks are apertured in the usual manner for the passage of axle bolts 14 on which are revolubly mounted pneumatic tire-supporting wheels 15, which wheels are arranged on opposite sides of the driving wheel 3 of the machine and are normally elevated a short distance above the surface of the ground. When the machine is running rapidly in a straight line and is perfectly balanced, the wheels 15 remain out of contact with the ground surface, but when the machine tilts laterally in either direction to a prescribed extent, one of the wheels 15 comes in contact with the ground and prevents further tilting movement.

The horizontal bracket arms 7 have angularly bent depending outer ends 16 which bear against the inner arms of the respective forks and are perforated for the passage of the inner ends of the bolts 14, by which they are fastened to the forks. The inner ends of the bracket arms are provided with downturned parallel extensions 17 having bearing slots 18, by which they may be fitted down upon the ends of the axle 19 of the driving wheel 3, by which the frame of the attachment is intermediately fastened to the machine. The extensions 17 are clamped in applied position by the axle nuts 20, and upon loosening said nuts and detaching the bolt 9, the attachment as a whole may be drawn upwardly and removed from the motorcycle to enable the tire of the wheel 3 or tire of either of the wheels 15, when punctured or otherwise injured to be repaired in a ready and convenient manner. These slots may be made of sufficient depth to permit the attachment to be adjusted to bring the wheels 15 into contact with the surface of the ground, when it is desired to normally employ such wheels in conjunction with the wheel 3 as a supporting wheel to prevent lateral tilting of the machine in either direction under all conditions of surface. The inner ends of the braces 8, which are inclined downwardly and inwardly from the upper ends of the forks, are provided with angularly bent ends 21 which are secured to the inner ends of the bracket arms 7 by bolts 22.

When the device is applied in the manner shown and described, it will be seen that it will be firmly supported in position by the attachment of the frame bar 5 to the said post 4 and a connection of the extension 17 of the arms 7 with the axle 19 of the driving wheel 3, whereby any possibility of deflection of the attachment from its normal operative position under strain will be prevented. In such position of use it will be understood that one or the other of the supporting wheels 15 will be utilized, according to the tilting of the machine in one direction or the other, to maintain the machine in an upright position in starting the motor running the machine slowly along the surface of the ground, and that one or the other of said wheels 15 may be employed in conjunction with the wheel 3 to support the machine in an erect position when at rest. In tilting the machine in rounding a curve, it will be seen that the wheel 15 on the down tilting side will come in contact with the surface of the ground and limit the tilting movement while supporting the machine during the rounding of the curve so that it cannot tilt over even when the machine is running at a very rapid rate of speed.

The advantages of the attachment will be readily understood from the foregoing description. The device may be applied to any ordinary make of motorcycle in the manner set forth, is comparatively light in weight and may be manufactured and sold at a comparatively low cost.

Having thus described my invention, I claim:—

1. In a motor cycle attachment, a frame bar, means for connecting the frame bar to the seat post of a motor cycle to support said frame bar above the rear wheel of the motor cycle, depending yokes secured to the outer ends of said frame bar, wheels journaled between the yokes, diagonal braces secured at their upper ends between the yokes and the frame bar and extending inwardly of said yokes and arms secured at their outer ends to the yokes and adapted to be connected at their inner ends to the axle of the rear wheel.

2. In a motor cycle attachment, a frame bar, means for connecting said frame bar to the seat post of a motor cycle, depending U-shaped yokes connected with the upper ends of the frame bar, horizontal bracket arms secured at their outer ends to the lower ends of the yokes and extending inwardly thereof, means for connecting the inner ends of said bracket arms to the axle of the rear wheel of a motor cycle, and diagonal braces secured at their upper ends between the yokes and the frame bar and extending inwardly of said yokes and connected at their inner ends to the horizontal bracket arms.

In testimony whereof I affix my signature in presence of two witnesses.

EMILE BRAZIL.

Witnesses:
   APPLETON R. HILLYER,
   DOTHA B. HILLYER.